United States Patent [19]

Hynninen

[11] Patent Number: 4,761,238
[45] Date of Patent: Aug. 2, 1988

[54] METHOD OF TREATMENT OF THE CIRCULATION WATER OF A PAPER MILL

[75] Inventor: Pertti K. Hynninen, Helsinki, Finland

[73] Assignee: Kamyr AB, Karlstad, Sweden

[21] Appl. No.: 68,667

[22] Filed: Jul. 1, 1987

[30] Foreign Application Priority Data

Jul. 2, 1986 [FI] Finland .................................. 862810

[51] Int. Cl.⁴ .............................................. B01D 21/01
[52] U.S. Cl. ...................................... 210/725; 162/29; 162/45; 162/76
[58] Field of Search ............... 210/749, 724, 725, 729, 210/639, 732–736, 743, 753–755; 162/76, 29, 17, 41, 42, 43, 45

[56] References Cited

U.S. PATENT DOCUMENTS 4,198,266  4/1980  Kirk et al. ............................ 162/29

Primary Examiner—Frank Sever
Attorney, Agent, or Firm—Nixon & Vanderhye

[57] ABSTRACT

A method for removing dissolved and colloidal material from the circulation water of a paper mill with chemical pulp fibers wherein fiber sludge which has been recovered from the paper manufacturing process and acidified to a pH of 1.5–2.5, is mixed with the circulation water of a paper mill whereby the dissolved and colloidal substances are precipitated.

6 Claims, 1 Drawing Sheet

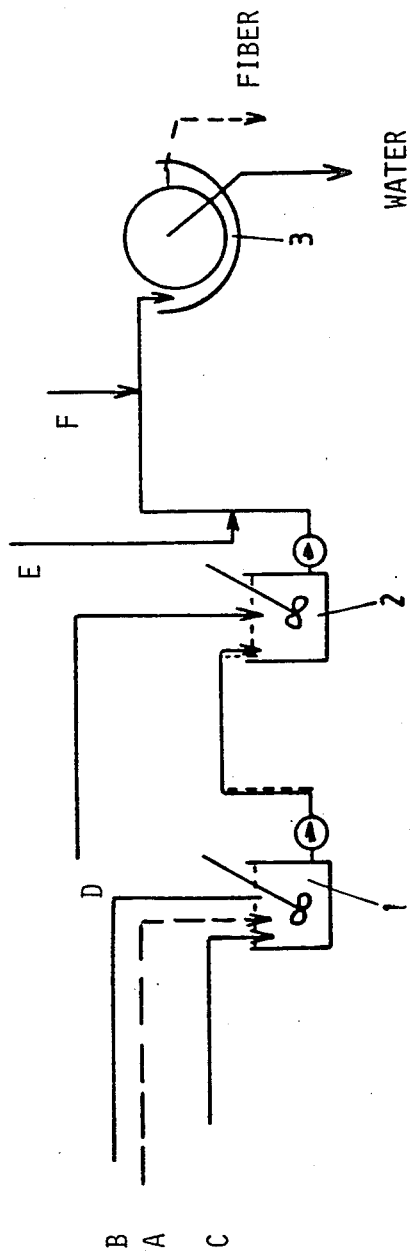

METHOD OF TREATMENT OF THE CIRCULATION WATER OF A PAPER MILL

The present invention relates to a method of minimizing the problems caused by dissolved and colloidal substances in the circulation water of a paper mill.

Dissolved and colloidal organic substances in the circulation water of a paper mill comprise partly carbon hydrates of wood, lignin and digested materials. Further, various anionic and cationic additives, such as dispersion agents, slime- and foam-fighting materials, starch and dry and wet strength adhesives are used in the manufacture of paper. Also coating chemicals get into the circulation water. Circulation water often contains also very fine-grained fillers.

The concentration of dissolved and colloidal substances in the circulation water of a paper machine can be so high that it severely disturbs the control and the economy of the process.

Some of the problems caused by dissolved and colloidal substances in the circulation water are the corrosion, the difficulties in cleanliness and in the dewatering. Further there are problems with bleaching and the retention of fines and fillers is reduced and the strength properties and the brightness of the paper is poor. The problems and their severity vary depending on the paper grade to be manufactured and on the machinery used in the manufacture.

There have been attempts to avoid the problems mostly by having an appropriately open water circulating system. The volume of water removed from the system varies mostly between 10 and 50 m³ per ton of paper. Further, the additives used in paper making such as aluminium sulfate, sodium aluminate and organic polymers precipitate dissolved substances to the paper web. Also rather large amounts of bentonite, in most cases 4 to 10 kg per to of paper, and organic polymer have sometimes been added to remove dissolved and colloidal substances.

The object of this invention is to provide an efficient method of reducing the volume of dissolved and colloidal substances in the circulation water by which method the volume of dissolved organic material is reduces by 30-50%. The capital and operation costs of the method are easily kept low.

The method of the present invention is characterized by the feature that part of the fiber used for making paper is, after grinding, acidified and mixed with a part of the circulation water. After the pH has been regulated and possibly also cationic polymers added, the fiber-water mixture is added to the paper pulp. If a large volume of circulation water is to be treated, the pulp to be added to the circulation water must be precipitated before it is added to the pulp to be ground. Precipitation can be carried out e.g. in a filter for the circulation water into which the acidified fiber is fed to form so-called surface pulp. From the filter the fiber is returned to the paper making process with the recovered solid material.

Laboratory tests have shown that addition of 2 g acidified fiber per liter circulating water of a paper mill reduces the turbidity of the effluent and the amount of dissolved organic substance by 90% expressed in numeric form. Precipitation is intensified if cationic polymer is added to the fiber-water mixture.

The invention is described further in detail by way of the following examples.

EXAMPLE 1

The effluent from a fine paper mill, the water comsumption of which was approx. 50–60 m³ per ton of paper, was treated with acidified chemical sulfate pulp fibers and with acidified fibers from the fine paper mill itself.

The chemical pulp fibers were acidified with sulfuric acid to a pH of approx. 1.8 and they were added to the effluent to be treated to a content of 4 to 6 g per liter effluent.

The pH of the mixture of effluent and chemical pulp fibers was regulated with sodium hydroxide to 5–6 and 1–2 g cationic polymer per m³ of effluent was added. The sludge was separated by sedimention.

The same procedure was used when effluent was treated with the sludge received from the fiber recovering unit of the fine paper mill.

As a result of the treatment the solids content of the effluent reduced by approx. 60% from what it had been after a simple sedimention of the same duration. A corresponding comparision showed a reduction of the turbidity of approx. 90% and the $COD_{Cr}$ reading had decreased by approx. 20%. A test with the sludge from the fiber recovering unit gave corresponding results.

The reduction of turbidity in particular is obviously caused by precipitation of the starch in circulation water.

EXAMPLE 2

The tests have resulted in the process chart illustrated in the appended schematic drawing, by way of example.

Chemical pulp a, dilution water b and sulfuric acid c is added to a vessel indicated by reference numeral 1 in the chart. The pH of the mixture is regulated to be approx. 1.5–2.0. The water-fiber mixture is then led to a mixing vessel 2 into which the process water d to be treated also is fed. After mixing, sodium hydroxide e is added to the water, which is fed to a fiber recovering unit 3, to obtain a pH of 5–6. After this in most cases 1–2 mg of cationic polymer f per liter of mixture is added. The polymer is preferably the same substance as is used in the paper machine.

From the fiber recovering unit the fibers and the dissolved and colloidal substance precipitated in the fibers are returned to the process for use in the paper manufacturing process.

Also, the water is recycled to the paper machine.

The chemical pulp fiber used in the precipitation is ordinary chemical pulp used in paper manufacturing. The volume of dissolved material which has adhered to the pulp is in the order of 0.1–1.0 kg per m³ of treated effluent.

EXAMPLE 3

The main dimensions of a proposed process for removing the dissolved and colloidal substances from the circulation water of a fine paper mill which produces 200 tons of paper per day and the circulation water volume of which is approx. 25 m³ per ton of paper, are as follows:

| effluent volume to be treated | m³/h | 200 |
| --- | --- | --- |
| required amount of chemical pulp | kg/h | 400 |
| amount of polymer | kg/h | 0.2–0.4 |
| pulp mixing vessel (vessel 1 in example 2) | m³ | 3 |
| mixing vessel for effluent and | m³ | 5 |

| | | |
|---|---|---|
| chemical pulp (vessel 2 in example 2) precipitating dissolved and colloidal substance | kg/h | 80–200 |

When this cleaning process is used the need to purify the circulation water system is reduced. If desired, the volume of water introduced to the system can be reduced which reduces the energy consumption and the cost of purifying the effluent.

The invention is not intended to be limited to the embodiments described here as examples only but several modifications and alternative applications of it are possible within the scope of protection defined by the appended patent claims.

I claim:

1. A method of treating the circulation water of a paper mill comprising: removing dissolved and colloidal substances from the circulation water by,
    (a) acidifying material selected from the group consisting essentially of chemical pulp, and fiber sludge recovered from a paper manufacturing process, to a pH of approximately 1.5–2.5; and
    (b) mixing the acidified material with the circulation water so that the material precipitates dissolved and colloidal substances from the circulation water.

2. A method as recited in claim 1 comprising the further step, (c), after step (b), of separating fiber from the circulation water using a fiber recovering unit.

3. A method as recited in claim 2 comprising the further step of intensifying the precipitating action of the acidified material by adding about 1–2 grams of organic polymer per cubic meter of acidified material, and mixing the acidified material and organic polymer with the circulation water.

4. A method as recited in claim 2 comprising the further step (d), between steps (b) and (c), of raising the pH of the mixture of material and circulation water to about 5–6.

5. A method as recited in claim 1 comprising the further step of intensifying the precipitating action of the acidified material by adding about 1–2 grams of organic polymer per cubic meter of acidified material, and mixing the acidified material and organic polymer with the circulation water.

6. A method as recited in claim 1 wherein the material is chemical pulp from the paper mill.

* * * * *